(12) United States Patent
Arao et al.

(10) Patent No.: US 9,348,089 B2
(45) Date of Patent: May 24, 2016

(54) OPTICAL MODULE

(71) Applicant: SUMITOMO ELECTRIC INDUSTRIES, LTD., Osaka-shi, Osaka (JP)

(72) Inventors: Hajime Arao, Yokohama (JP); Toshihisa Yokochi, Yokohama (JP); Atsushi Suzuki, Yokohama (JP); Mitsuaki Tamura, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 51 days.

(21) Appl. No.: 14/369,218

(22) PCT Filed: Dec. 20, 2012

(86) PCT No.: PCT/JP2012/083058
§ 371 (c)(1),
(2) Date: Jun. 27, 2014

(87) PCT Pub. No.: WO2013/099753
PCT Pub. Date: Jul. 4, 2013

(65) Prior Publication Data
US 2015/0016772 A1    Jan. 15, 2015

(30) Foreign Application Priority Data
Dec. 28, 2011    (JP) ................................. 2011-289052

(51) Int. Cl.
*G02B 6/12*    (2006.01)
*G02B 6/42*    (2006.01)
*G02B 6/38*    (2006.01)

(52) U.S. Cl.
CPC .. *G02B 6/12* (2013.01); *G02B 6/42* (2013.01); *G02B 6/428* (2013.01); *G02B 6/4269* (2013.01);

(Continued)

(58) Field of Classification Search
CPC .. G02B 6/4214; G02B 6/4296; G02B 6/4273; G02B 6/4272; G02B 6/0218; G02B 6/4269; G02B 6/43; G02B 6/14; H01L 2924/00; H01L 2924/00014
USPC .......................................... 385/14, 15, 31, 39
See application file for complete search history.

(56) References Cited

U.S. PATENT DOCUMENTS 7,118,293 B2 * 10/2006 Nagasaka et al. ................ 385/89
7,404,680 B2 *  7/2008 Ono et al. ........................ 385/88

(Continued)

FOREIGN PATENT DOCUMENTS

| CN | 1820215 A | 8/2006 |
|---|---|---|
| CN | 101995621 A | 3/2011 |

(Continued)

OTHER PUBLICATIONS

Takaya et al.,Single-mode multifiber connector using an injection molded MT type ferrule and a quick assembly technique, Apr. 2000, Optical Engineering, vol. 39, No. 4, pp. 1025-1031.*

(Continued)

*Primary Examiner* — Jennifer Doan
(74) *Attorney, Agent, or Firm* — Drinker Biddle & Reath LLP

(57) ABSTRACT

An optical module (1) of the invention includes a circuit substrate (24) on which light receiving and emitting elements (52) are mounted, a connector component (54) for holding optical fibers (7), and a lens array component (55) which is fixed on the circuit substrate (24) and optically connects the optical fibers (7) to the light receiving and emitting elements (52) on the circuit substrate (24), and the circuit substrate (24) has a lens array mounting region (A1) in which the lens array component (55) is fixed and a connector component opposed region (A2) opposed to the connector component (54), and thermal insulation space is formed between the connector component (54) and the connector component opposed region (A2).

9 Claims, 13 Drawing Sheets

(52) U.S. Cl.
 CPC ............ *G02B 6/4273* (2013.01); *G02B 6/4284* (2013.01); *G02B 6/3885* (2013.01); *G02B 6/423* (2013.01); *G02B 6/4214* (2013.01); *G02B 6/4246* (2013.01)

(56) References Cited

U.S. PATENT DOCUMENTS

| | | | |
|---|---|---|---|
| 2004/0120654 A1* | 6/2004 | Kevern | 385/78 |
| 2006/0110109 A1* | 5/2006 | Yi et al. | 385/93 |
| 2006/0164738 A1 | 7/2006 | Yamamoto et al. | |
| 2008/0247713 A1* | 10/2008 | Tamura et al. | 385/93 |
| 2011/0031385 A1* | 2/2011 | Ishigami et al. | 250/239 |
| 2011/0103797 A1* | 5/2011 | Oki et al. | 398/79 |

FOREIGN PATENT DOCUMENTS

| | | |
|---|---|---|
| JP | 2005-031556 A | 2/2005 |
| JP | 2007-019411 A | 1/2007 |
| JP | 2008-225510 A | 9/2008 |
| JP | 2008-257094 A | 10/2008 |
| JP | 2010-122312 A | 6/2010 |
| JP | 2011-053341 A | 3/2011 |
| JP | 2011-155288 A | 8/2011 |

OTHER PUBLICATIONS

Campo, E. A, Selection of Polymeric Materials—How to Select Design Properties from Different Standards, 2008, William Andrew Publishing/Plastics Design Library, p. 109.*

O'Brien, R. L, Jefferson's Welding Encyclopedia (18th Edition), 1997, American Welding Society (AWS), p. 527.*

Office Action issued Feb. 28, 2015 in Chinese Patent Application No. 201280032298.3 (9 pages) with English Translation (7 pages).

* cited by examiner

OPTICAL MODULE

CROSS-REFERENCE TO RELATED APPLICATIONS

This application is a National Stage Application of PCT/JP2012/083058, filed Dec. 20, 2012, which claims the benefit of Japanese Patent Application No. 2011-289052, the contents of which are incorporated herein by reference.

TECHNICAL FIELD

The present invention relates to an optical module including a circuit substrate on which an optical element is mounted.

BACKGROUND ART

In recent years, an optical module used in network equipment is becoming more multichannel, higher in speed and smaller in size. One example of the optical module adapted to become more multichannel, higher in speed and smaller in size is an optical module including the optical element including a photo detector and a light emitter and a light emitting element formed on a circuit substrate, a lens block having a lens facing to the optical element, and a ferrule connected to the lens block, the ferrule in which an optical fiber is inserted (see Patent Document 1).

Patent Document 1: JP-A-2010-122312

When the inside of the optical module is provided with a photoelectric conversion part for converting an electrical signal into an optical signal, it is necessary to design the whole module in consideration of heat generated in the photoelectric conversion part. On the other hand, workability of an assembly process of assembling the module is also one important problem.

In the optical module disclosed in Patent Document 1, the lens block is mounted in the end of the circuit substrate and a protrusion formed on the ferrule is inserted into a hole bored in the lens block to thereby connect both members. However, since this configuration does not have a region in which the ferrule is mounted on the circuit substrate, insertion work of the ferrule cannot be done along the circuit substrate and workability decreases. Also, when an assembly worker accidentally applies a force vertical to a connection direction to the ferrule after connection between both members, the protrusion formed on the ferrule may break.

Hence, in the optical module of Patent Document 1, it is contemplated to extend the end of the circuit substrate to a predetermined region in which the ferrule is mounted and support the ferrule by a part of the circuit substrate. However, in this configuration, heat generated in the photoelectric conversion part concentrates on the lens block or the ferrule. Then, since the lens block differs from the ferrule in a thermal expansion coefficient, different thermal stresses are applied to the lens block and the ferrule. When the different thermal stresses are applied to the portion of bonding between the lens block and the ferrule, unexpected variations are given to the portion of optical coupling between the lens block and the ferrule, and communication quality may deteriorate.

An object of the invention is to provide an optical module capable of reducing an influence of heat generated in a photoelectric conversion part while ensuring workability at the time of assembly.

SUMMARY

In order to achieve the object described above, an optical module of the invention is an optical module including a circuit substrate on which an optical element is mounted; an optical fiber holding member for holding an optical fiber; and an optical coupling member which is fixed on the circuit substrate and optically connects the optical fiber to the optical element on the circuit substrate, wherein the circuit substrate has a first region in which the optical coupling member is fixed and a second region opposed to the optical fiber holding member, and a thermal insulation space is formed between the optical fiber holding member and the second region.

Also in the optical module of the invention, preferably, the optical coupling member is fixed to the circuit substrate by an adhesive and a first connecting part is formed on the optical coupling member, and a second connecting part connected to the first connecting part and an optical fiber holding hole into which the optical fiber is inserted are formed in the optical fiber holding member, and the optical fiber is fixed to the optical fiber holding hole by an adhesive, the optical fiber holding member has a first surface and a second surface, the second surface is formed opposite to the first surface, and the first surface is opposed to the thermal insulation space, and in a state in which the optical coupling member is connected to the optical fiber holding member by the first connecting part and the second connecting part, the optical fiber holding hole is formed at a position which is more distant from the circuit substrate than a position at which the second connecting part is formed in the second surface.

Also in the optical module of the invention, preferably, the circuit substrate has a first mounting surface on which the optical element is mounted and a second mounting surface opposite to the first mounting surface, and a heat conducting member is mounted on the second mounting surface of the circuit substrate, and the heat conducting member has a first heat conducting portion in the first region of the second mounting surface and a second heat conducting portion in the second region of the second mounting surface, and an area of the first heat conducting portion is larger than an area of the second heat conducting portion.

Also in the optical module of the invention, the heat conducting member may be configured to be formed in the first region of the second mounting surface and be not formed in the second region of the second mounting surface.

Also in the optical module of the invention, the heat conducting member is preferably formed in the first region of the second mounting surface and is provided so as to extend to a side opposite to the second region.

Also in the optical module of the invention, an electronic component with a heating value higher than that of the optical element is preferably mounted on the circuit substrate in a region opposite to the second region with respect to the first region.

Also in the optical module of the invention, the electronic component is preferably mounted on the second mounting surface of the circuit substrate.

Also, the optical module of the invention preferably includes a clip member for mechanically joining the optical coupling member to the optical fiber holding member.

Also in the optical module of the invention, preferably, the clip member is a member with thermal conductivity higher than that of the optical fiber holding member, and the clip member makes contact with at least a part of the second surface of the optical fiber holding member.

According to the optical module of the invention, the optical module capable of reducing an influence of heat generated in a photoelectric conversion part while ensuring workability at the time of assembly can be provided.

DETAILED DESCRIPTION

Preferred embodiments of the invention will hereinafter be described in detail with reference to the accompanying drawings. In addition, in explanation of the drawings, the same numerals are assigned to the same or equivalent elements and the overlap explanation is omitted.

First Embodiment

First, an optical module according to a first embodiment will be described. An optical module 1 shown in FIG. 1 is used for transmitting a signal (data) in optical communication technology etc., and is electrically connected to an electronic device such as a personal computer of a connection destination and converts inputted and outputted electrical signals into optical signals and transmits the optical signals.

Figure 1:
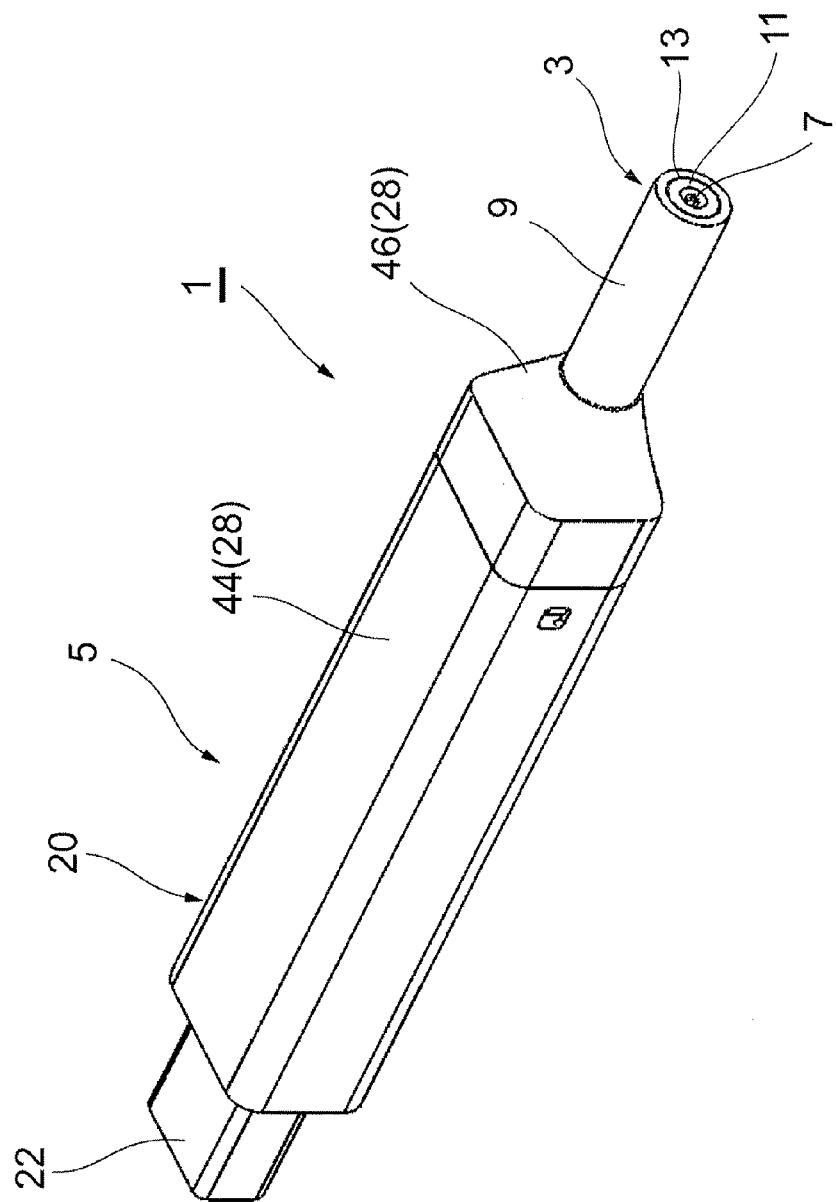
FIG. 1 is a perspective view showing an optical module according to a first embodiment.

As shown in FIG. 1, the optical module 1 includes an optical cable 3 and a connector module 5. The optical module 1 is configured to attach the distal end of the single-core or multi-core optical cable 3 to the connector module 5.

Figure 2:
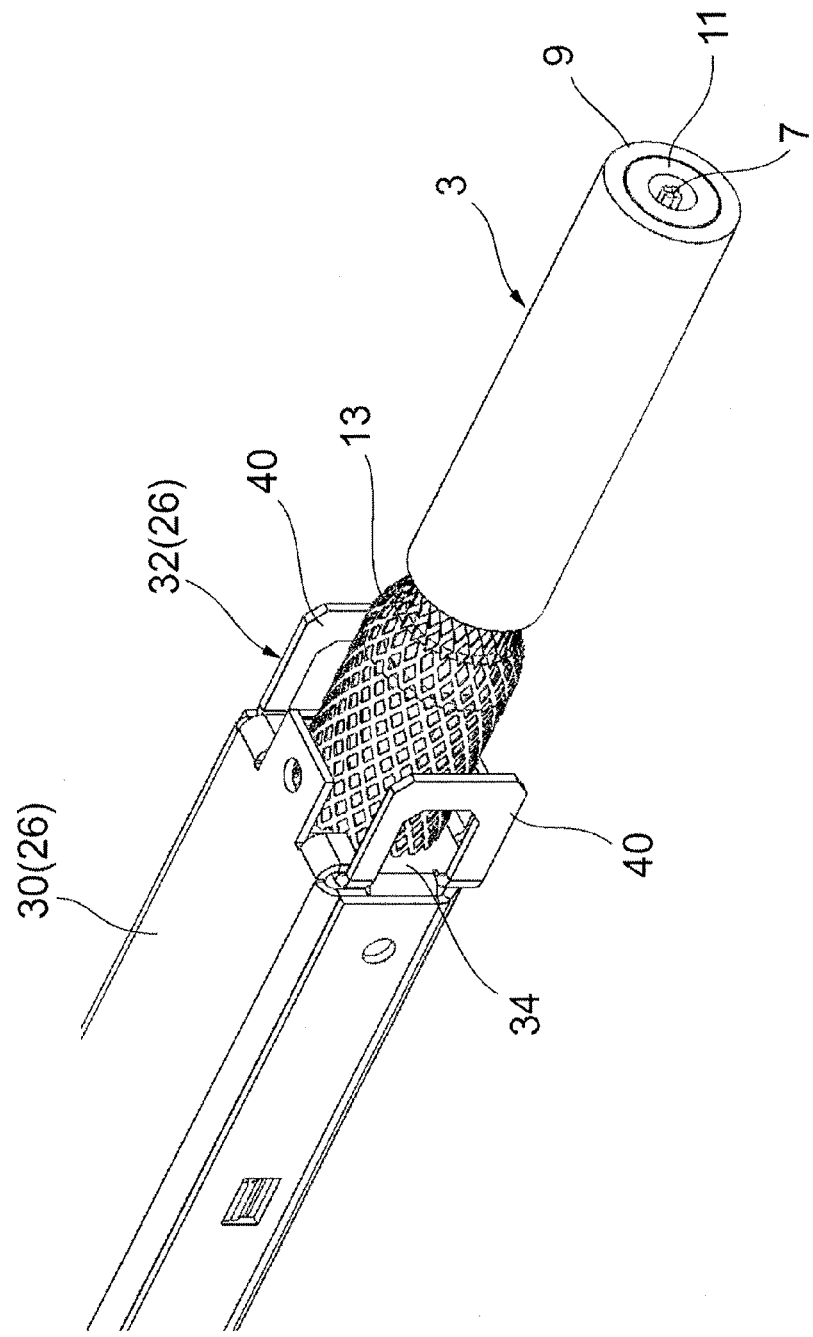
FIG. 2 is a perspective view showing a state in which a resin housing is detached.
Figure 3:
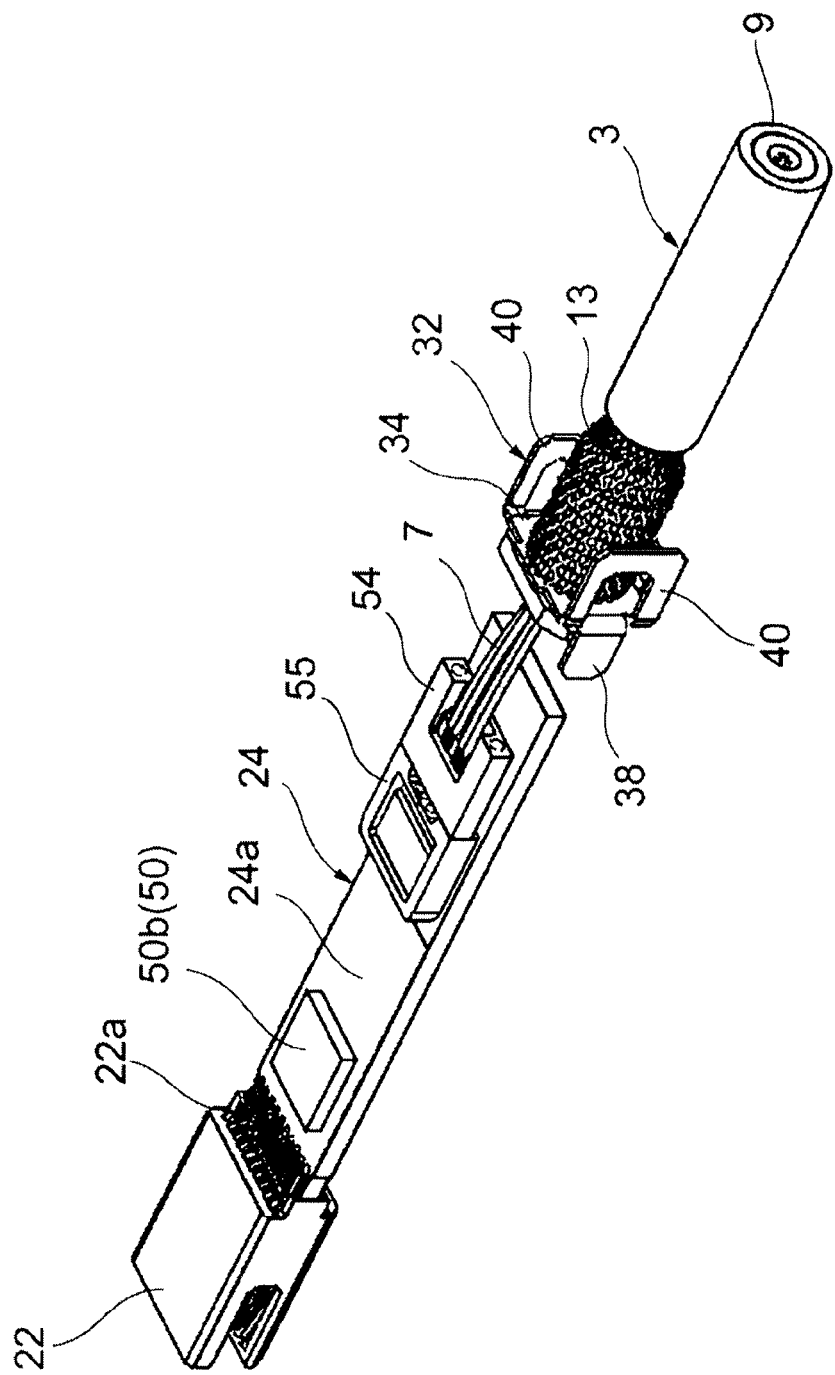
FIG. 3 is a perspective view showing a state in which a metal housing is detached.

The optical cable 3 has plural (four herein) optical fibers 7, a resin-made outer sheath 9 for covering the optical fibers 7, an ultrathin-diameter tensile strength fiber (Kevlar) 11 interposed between the optical fibers 7 and the outer sheath 9, and a metal braid 13 interposed between the outer sheath 9 and the tensile strength fiber 11 as shown in FIGS. 1 to 3. In other words, in the optical cable 3, the optical fibers 7, the tensile strength fiber 11, the metal braid 13 and the outer sheath 9 are arranged in this order from the center of the optical cable 3 toward the radial outside.

As the optical fibers 7, an optical fiber in which a core and cladding are made of quartz glass (AGF: All Glass Fiber), an optical fiber in which cladding is made of hard plastic (HPCF: Hard Plastic Clad Fiber), etc. can be used. In the case of using the HPCF with a small diameter in which a core diameter of glass is 80 μm, the HPCF is resistant to fracture even when the optical fibers 7 is bent in a small diameter. The outer sheath 9 is formed of, for example, PVC (polyvinylchloride) which is a halogen-free flame-retardant resin. An outside diameter of the outer sheath 9 is about 4.2 mm, and thermal conductivity of the outer sheath 9 is, for example, 0.17 W/m·K. The tensile strength fiber 11 is, for example, an aramid fiber, and is built into the optical cable 3 in a state gathered in a bundle shape.

The metal braid 13 is formed of, for example, a tin-plated conductive wire, and a braid density is 70% or more, and a knitting angle is 45° to 60°. An outside diameter of the metal braid 13 is about 0.05 mm. Thermal conductivity of the metal braid 13 is, for example, 400 W/m·K. The metal braid 13 is preferably arranged in a high density in order to well ensure thermal conduction, and is preferably constructed of a tin-plated conductive wire of a rectangular wire by way of example.

The connector module 5 includes a housing 20, an electrical connector 22 formed on the front end (distal end) side of the housing 20, and a circuit substrate 24 received in the housing 20.

The housing 20 includes a metal housing (first housing) 26 and a resin housing (second housing) 28. The metal housing 26 includes a receiving member 30, and a fixing member 32 which is joined to the back end of the receiving member 30 and fixes the optical cable 3. The metal housing 26 is formed of a metal material with high thermal conductivity (preferably, 100 W/m·K or more), for example, steel (Fe series), tin (tin-plated copper), stainless steel, copper, brass or aluminum. The metal housing 26 constructs a thermal conductor.

The receiving member 30 is a tubular hollow member whose cross section shows substantially a rectangular shape. The receiving member 30 defines receiving space S for receiving the circuit substrate 24 etc. The front end side of the receiving member 30 is provided with the electrical connector 22, and the fixing member 32 is joined to the back end side of the receiving member 30.

The fixing member 32 has a plate-shaped basal part 34, a tubular part 36, a pair of first overhanging pieces 38 forward overhanging from both sides of the basal part 34, and a pair of second overhanging pieces 40 backward overhanging from both sides of the basal part 34. The pair of first overhanging pieces 38 is respectively inserted from the back of the receiving member 30, and abuts on and is joined to the receiving member 30. The pair of second overhanging pieces 40 is joined to a boot 46 of the resin housing 28 described below. In addition, in the fixing member 32, the basal part 34, the tubular part 36, the first overhanging pieces 38 and the second overhanging pieces 40 are integrally formed by sheet metal.

The tubular part 36 has substantially a cylindrical shape and is formed so as to backward project from the basal part 34. The tubular part 36 holds the optical cable 3 in cooperation with a crimp ring 42. Concretely, after the outer sheath 9 is peeled, the optical fibers 7 of the optical cable 3 are inserted into the tubular part 36 and also the tensile strength fiber 11 is arranged along an outer peripheral surface of the tubular part 36. Then, the crimp ring 42 is arranged on the tensile strength fiber 11 arranged on the outer peripheral surface of the tubular part 36, and the crimp ring 42 is crimped. Accordingly, the tensile strength fiber 11 is fixed by being pinched between the tubular part 36 and the crimp ring 42, and the optical cable 3 is held and fixed to the fixing member 32.

The end of the metal braid 13 of the optical cable 3 is bonded to the basal part 34 by solder. Concretely, the metal braid 13 is arranged so as to cover the outer periphery of the crimp ring 42 (tubular part 36) in the fixing member 32, and the end of the metal braid 13 is extended to one surface (back surface) of the basal part 34 and is bonded by solder.

Accordingly, the metal braid 13 is thermally connected to the fixing member 32. Further, by coupling the fixing member 32 to the back end of the receiving member 30, the fixing member 32 is physically and thermally connected to the receiving member 30. In other words, the metal braid 13 of the optical cable 3 is thermally connected to the receiving member 30.

The resin housing 28 is formed of a resin material such as polycarbonate, and covers the metal housing 26. The resin 12 housing 28 has an exterior housing 44, and the boot 46 joined to the exterior housing 44. The exterior housing 44 is formed so as to cover an outer surface of the receiving member 30. The boot 46 is joined to the back end of the exterior housing 44, and covers the fixing member 32 of the metal housing 26. The back end of the boot 46 is glued to the outer sheath 9 of the optical cable 3 by an adhesive (not shown).

The electrical connector 22 is the portion inserted into a connection target (a personal computer etc.) and electrically connected to the connection target. The electrical connector 22 is arranged in the front end side of the housing 20, and forward projects from the housing 20. The electrical connector 22 is electrically connected to the circuit substrate 24 by a contact 22a.

The circuit substrate 24 is received in the receiving space S of the metal housing 26 (receiving member 30). A semiconductor 50 for control and light receiving and emitting elements 52 are mounted on the circuit substrate 24. The circuit substrate 24 electrically connects the semiconductor 50 for control and the light receiving and emitting elements 52. The circuit substrate 24 shows substantially a rectangular shape in plan view, and has a predetermined thickness. The circuit substrate 24 is, for example, an insulating substrate such as a glass epoxy substrate or a ceramic substrate, and circuit wiring is formed on the surface of or inside the circuit substrate 24 by, for example, gold (Au), aluminum (Al) or copper (Cu). The semiconductor 50 for control and the light receiving and emitting elements 52 construct a photoelectric conversion part.

The semiconductor 50 for control includes a driving IC (Integrated Circuit) 50a, a CDR (Clock Data Recovery) device S0b which is a waveform shaper, etc. The semiconductor 50 for control is arranged in the front end side of a front surface 24a (one example of a first mounting surface) in the circuit substrate 24. The semiconductor 50 for control is electrically connected to the electrical connector 22.

Figure 4A:
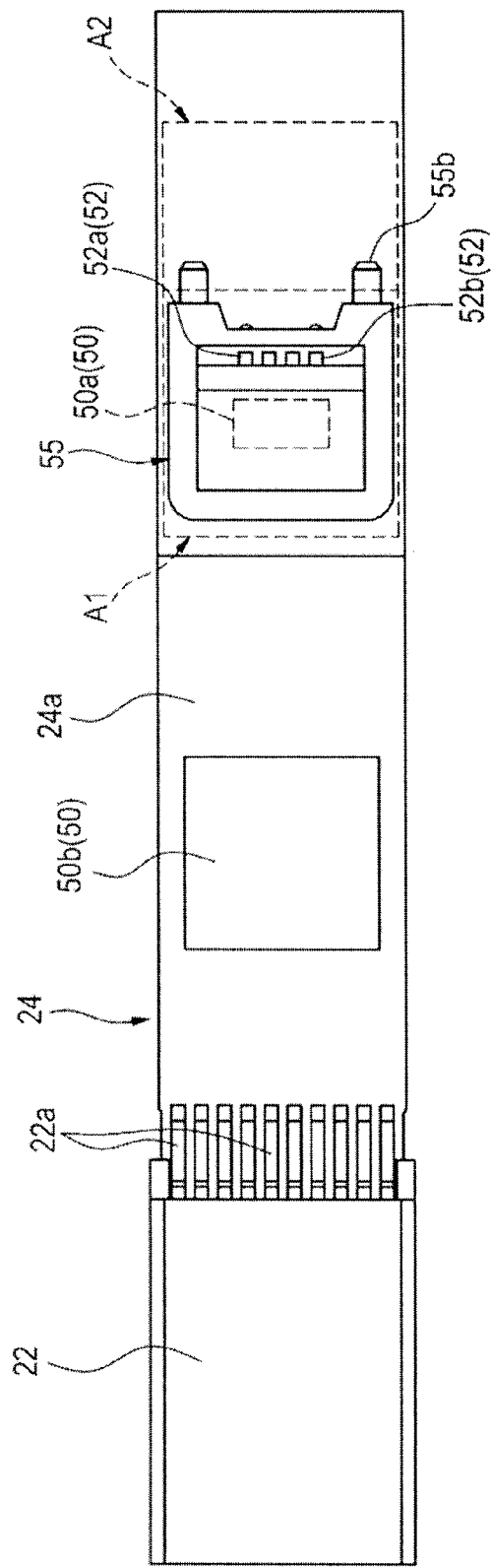
FIG. 4A is a view seeing a substrate shown in FIG. 3 from above.
Figure 4B:
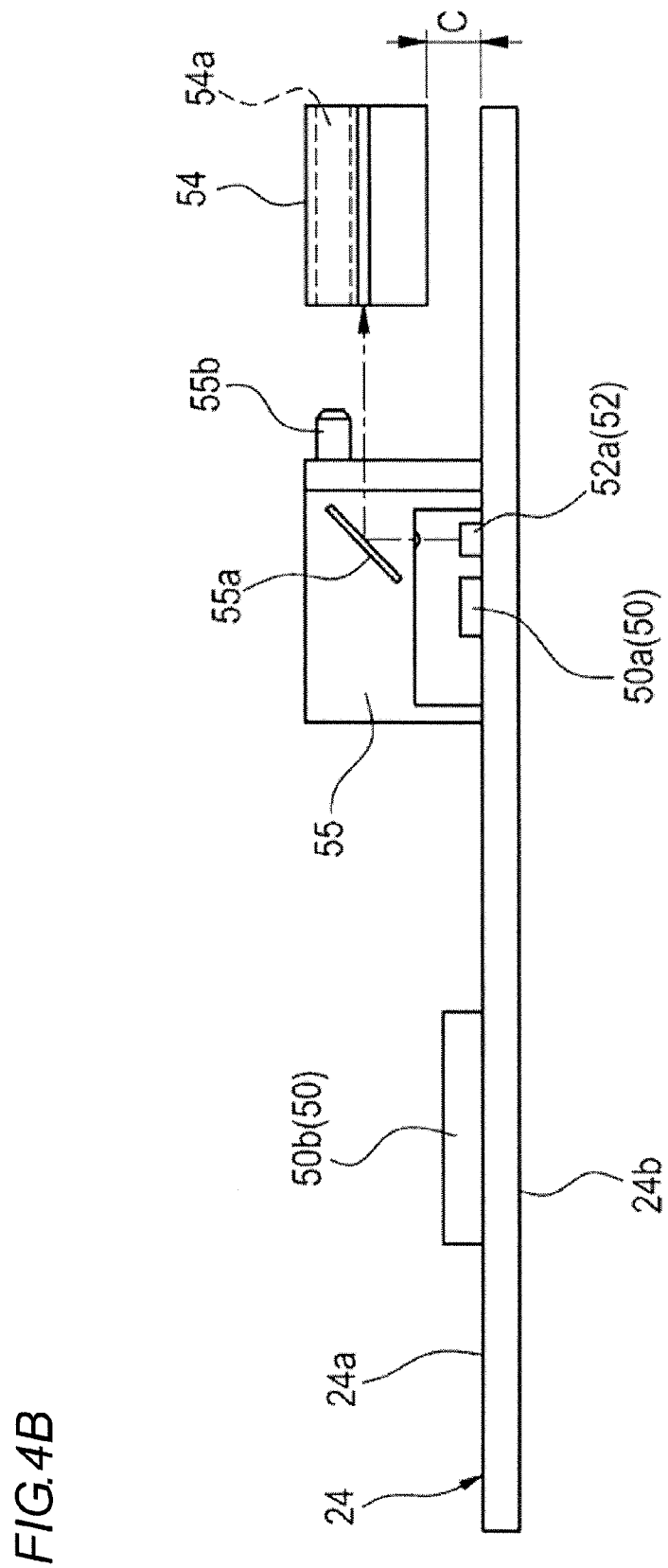
FIG. 4B is a view seeing the substrate shown in FIG. 3 from the lateral side.

As shown in FIG. 4A and FIG. 4B, the light receiving and emitting elements 52 are configured to include plural (two herein) light emitting elements 52a and plural (two herein) light receiving elements 52b. The light emitting elements 52 a and the light receiving elements 52b are arranged in the back end side of the front surface 2 4a in the circuit substrate 24. As the light emitting element 52 a, for example, a light emitting diode (LED), a laser diode (LD) or a vertical cavity surface emitting laser (VCSEL) can be used. As the light receiving element 52b, for example, a photo diode (PO) can be used.

The light receiving and emitting elements 52 are optically connected to the optical fibers 7 of the optical cable 3. Concretely, as shown in FIG. 4B, a lens array component 55 (one example of an optical coupling member) is arranged on the circuit substrate 24 so as to cover the light receiving and emitting elements 52 and the driving IC 50a. A reflector 55a for reflecting and bending light emitted from the light emitting element 52a or light emitted from the optical fibers 7 is arranged in the lens array component 55. A connector component 54 (one example of an optical fiber holding member) is attached to the distal end of the optical fibers 7 (not shown in FIG. 4A and FIG. 4B), and a positioning pin 55b is fitted into a positioning hole 54a to thereby position and couple the lens array component 55 to the connector component 54, and the light receiving and emitting elements 52 are optically connected to the optical fibers 7.

Also in the embodiment described above, as shown in FIG. 4B, the light receiving and emitting elements 52 and the optical fibers 7 have different optical axes, and optical axis directions are converted so that the light receiving and emitting elements 52 are optically coupled to the optical fibers 7 by the reflector 55a of the lens array component 55 which is the optical coupling member. Also, the positioning pin 55b formed on the lens array component 55 is formed so as to project in a direction substantially parallel to the optical axis of the optical fibers 7. The connector component 54 for holding the optical fibers 7 is moved in the direction substantially parallel to the optical axis of the optical fibers 7 and thereby, the positioning pin 55b of the lens array component 55 is fitted into the positioning hole 54a of the connector component 54 and the light receiving and emitting elements 52 are optically coupled to the optical fibers 7. Since a projection direction of the positioning pin 55b is substantially parallel to a surface direction of the circuit substrate 24, the connector component 54 can be connected along the front surface of the circuit substrate 24 and efficiency (workability) of assembly work improves.

The lens array component 55 preferably includes collimation lenses for collimating incident light and collecting and emitting the parallel light in an incoming part and an outgoing part of light. Such a lens array component 55 can be integrally constructed by injection molding of resin. The lens array component 55 and the connector component 54 are formed of different materials and have mutually different thermal expansion coefficients.

Figure 5:
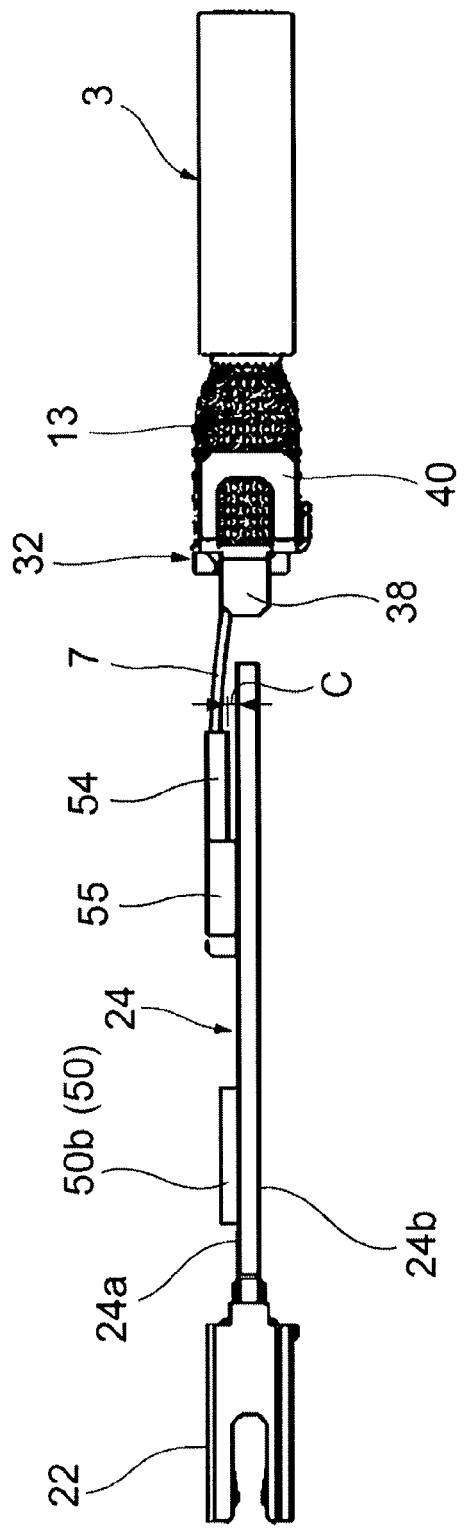
FIG. 5 is a view seeing a circuit substrate and a fixing member shown in FIG. 3 from the lateral side.

Also, as shown in FIG. 4A, the circuit substrate 24 has a lens array mounting region A1 (one example of a first region) in which the lens array component 55 is mounted, and a connector component opposed region A2 (one example of a second region) to which the connector component 54 is opposed. As shown in FIG. 4B, a thermal insulation space having a predetermined distance C is formed between the connector component 54 and the connector component opposed region A2. As shown in FIG. 5, this thermal insulation space is ensured even in a state in which the lens array component 55 is connected to the connector component 54.

The lens array component 55 is preferably constructed of a resin (for example, a polyetherimide resin: a linear expansion coefficient of $5.6 \times 10^{-5}$/K) having high dimension accuracy in molding and high transparency to communication light, and further in the case of assuming use in a high-temperature environment, the lens array component 55 is constructed of a resin (for example, an electron beam cross-linked resin: a linear expansion coefficient of $9.0 \times 10^{-5}$/K) capable of withstanding high-temperature treatment such as reflow and having high transparency to communication light. Also, the connector component 54 is constructed of a material (for example, a polyphenylene sulfide resin: a linear expansion coefficient of $2.6 \times 10^{-5}$/K) having high dimension accuracy in molding.

Figure 6:
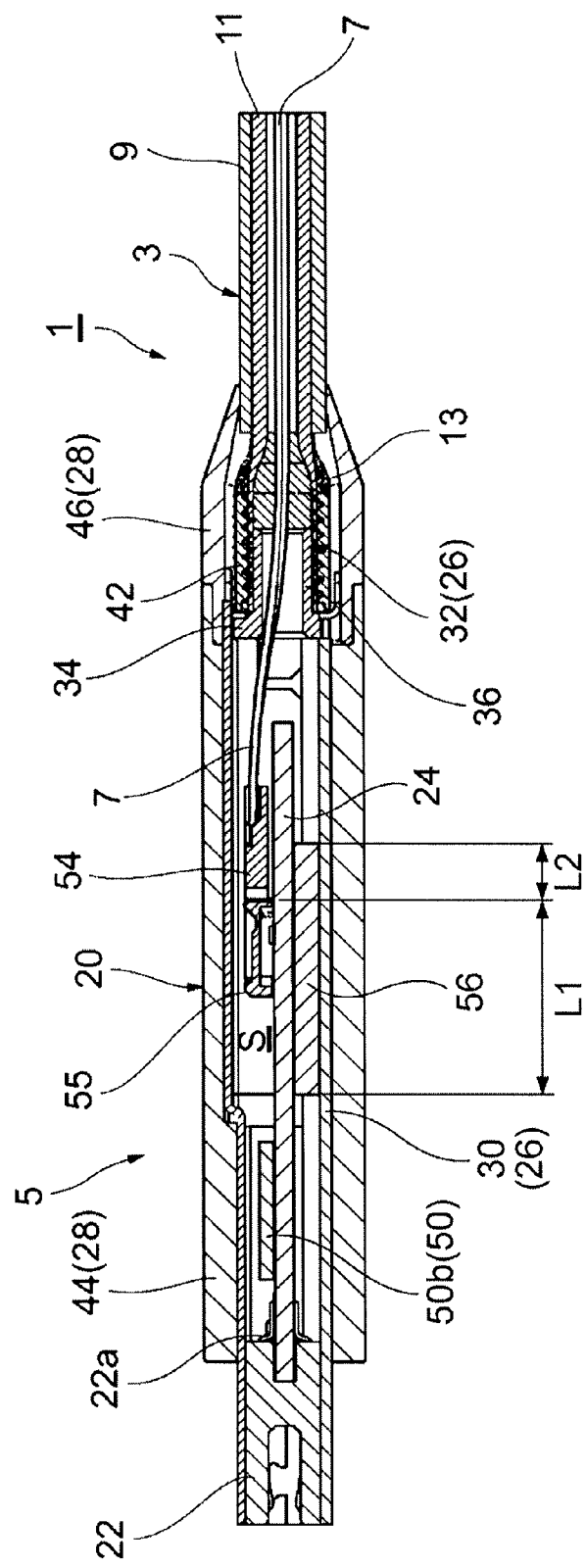
FIG. 6 is a sectional view of the optical module shown in FIG. 1.

As shown in FIG. 6, a heat conducting sheet 56 is arranged between the circuit substrate 24 and the receiving member 30 (metal housing 26). The heat conducting sheet 56 is a thermal conductor formed of material having thermal conductivity and flexibility. The heat conducting sheet 56 is formed so as to cover the whole back side of the lens array mounting region A1 from the vicinity of the center of the back side of the connector component opposed region A2 in a back surface 2 4b (one example of a second mounting surface and see FIG. 4B) of the circuit substrate 24 and further extend toward the electrical connector 22. The heat conducting sheet 56 includes a connector component corresponding portion having a length L2 ranging from the vicinity of the center of the back side of the connector component opposed region A2 to one end of the connector component opposed region A2, and a lens array component corresponding portion having a length L1 ranging from one end of the connector component opposed region A2 to the vicinity near to the back side of the CDR device SOb beyond the whole back side of the lens array mounting region A1 as shown in FIG. 6. Since a length of the heat conducting sheet 56 in a width direction is constant, the area in which the lens array component corresponding portion defined by the length L1 makes contact with the circuit substrate 24 is larger than the area in which the connector component corresponding portion defined by the length L2 makes contact with the circuit substrate 24.

Also, in the heat conducting sheet 56, the upper surface is physically and thermally connected to the back surface 24b of the circuit substrate 24 and also the lower surface is physically and thermally connected to the inside surface of the receiving member 30. By this heat conducting sheet 56, the circuit substrate 24 is thermally connected to the metal housing 26, and heat of the circuit substrate 24 is transferred to the receiving member 30.

Figure 7:
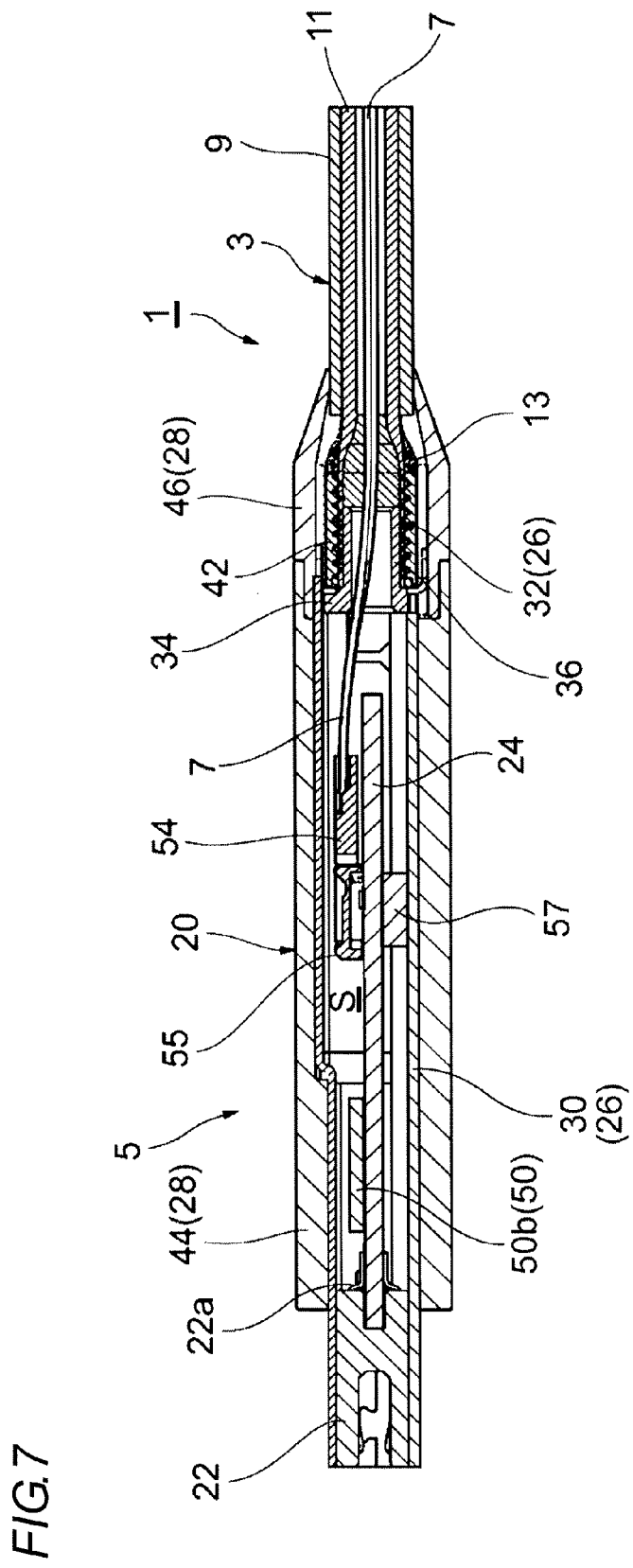
FIG. 7 is a view showing a modified example of a heat conducting sheet shown in FIG. 6.

In addition, the heat conducting sheet may be formed on only the back side of the lens array mounting region A1 like a heat conducting sheet 57 shown in FIG. 7. That is, it may be constructed so that the heat conducting sheet 57 is not formed on the back side of the connector component opposed region A2.

In the optical module 1 having the configuration described above, an electrical signal is inputted from the electrical connector 22, and the semiconductor 50 for control inputs the electrical signal through wiring of the circuit substrate 24. In the electrical signal inputted to the semiconductor 50 for control, for example, the level is adjusted or a waveform is shaped by the CDR device 50b and thereafter, the electrical signal is outputted from the semiconductor 50 for control to the light receiving and emitting elements 52 through wiring of the circuit substrate 24. In the light receiving and emitting elements 52 to which the electrical signal is inputted, the electrical signal is converted into an optical signal and the optical signal is emitted from the light emitting element 52a to the optical fibers 7.

Also, an optical signal transmitted by the optical cable 3 enters the light receiving element 52b. In the light receiving and emitting elements 52, the entering optical signal is converted into an electrical signal and this electrical signal is outputted to the semiconductor 50 for control through wiring of the circuit substrate 24. In the semiconductor 50 for control, the electrical signal is outputted to the electrical connector 22 after predetermined processing is performed on the electrical signal.

Subsequently, a heat conducting method in the optical module 1 will be described with reference to FIG. 6. Heat generated in the semiconductor 50 for control and the light receiving and emitting elements 52 mounted on the circuit substrate 24 is first transferred to the circuit substrate 24. The heat transferred to the circuit substrate 24 is transferred to the receiving member 30 through the heat conducting sheet 56. Next, the heat is transferred from the receiving member 30 to the fixing member 32 joined to the receiving member 30, and is transferred to the metal braid 13 of the optical cable 3 connected to the fixing member 32. Then, the heat transferred to the fixing member 32 is radiated to the outside through the outer sheath 9 of the optical cable 3. As described above, in the optical module 1, the heat generated in the semiconductor 50 for control and the light receiving and emitting elements 52 which are heating elements is radiated to the outside.

In the present embodiment as described above, the circuit substrate 24 has the lens array mounting region A1 in which the lens array component 55 is mounted and the connector component opposed region A2 to which the connector component 54 is opposed. Consequently, at the time of assembly work, a sudden force can be prevented from being applied to the connector component 54 by the circuit substrate 24. Also, even when a sudden force is applied after the lens array component 55 is bonded to the connector component 54, the circuit substrate 24 makes contact with the connector component 54 to make support and thereby, the portion of bonding between the lens array component 55 and the connector component 54 can be prevented from being damaged. Also, when the connector component 54 is connected to the lens array component 55, the connector component 54 can be connected along the connector component opposed region A2 of the circuit substrate 24, so that efficiency (workability) of assembly work improves.

Also, a thermal insulation space having the predetermined distance C is formed between the connector component opposed region A2 and the connector component 54 connected to the lens array component 55. In this thermal insulation space, heat generated from the light receiving and emitting elements 52 in the case of photoelectric conversion is not transferred from the circuit substrate 24 to the connector component 54 directly, and a part of the connector component 54 is supported in a state separated from the circuit substrate 24 by a predetermined distance so as not to abut on the circuit substrate 24. Also, the heat generated from the light receiving and emitting elements 52 can be lost from the thermal insulation space. From the standpoint of reducing damage to the positioning pin 55b from an external force and workability of connection between the lens array component 55 and the connector component 54 while having such an effect, the predetermined distance C of the thermal insulation space is preferably about 50 μm to 300 μm, more preferably about 50 μm to 100 μm. Thus, an optical connection state can be prevented from varying due to deviation of a position of an end face of the optical fibers 7 from a lens part of the lens array component 55 when the lens array component 55 and the connector component 54 thermally expand.

That is, since the lens array component 55 and the connector component 54 have different thermal expansion coefficients, when both of the components change to a high-temperature state in the case of fixing the connector component 54 to the circuit substrate 24, a stress may be caused on a surface of bonding between both of the components to damage the surface of bonding. However, since the embodiment has the configuration (configuration having the thermal insulation space) in which the connector component 54 does not make contact with the connector component opposed region A2 of the circuit substrate 24, the stress due to thermal expansion of the connector component 54 can be prevented from concentrating on the surface of bonding.

Figure 8:
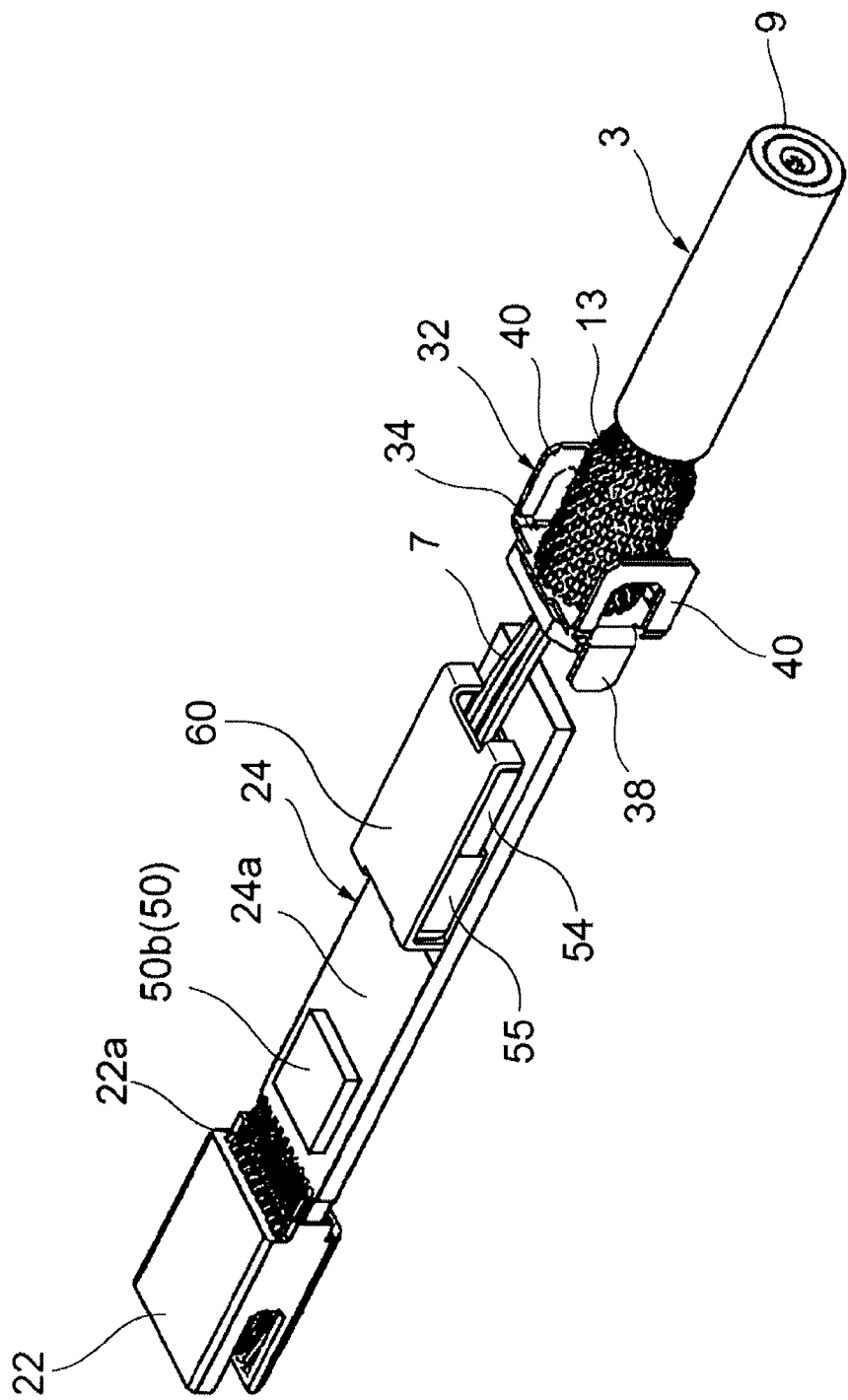
FIG. 8 is a perspective view showing a modified example having a clip member.
Figure 9:
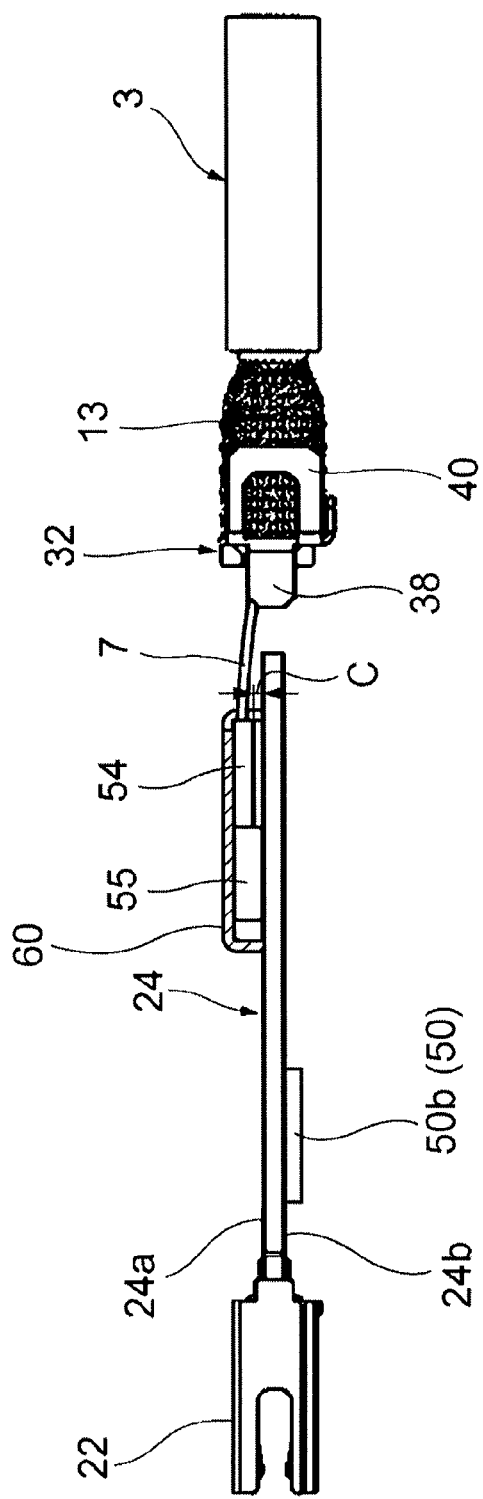
FIG. 9 is a view seeing a circuit substrate and an electronic component on the circuit substrate shown in FIG. 8 from the lateral side.

Also, in the embodiment, the case of positioning and coupling the connector component 54 and the lens array component 55 by the positioning pin is described, but a clip member 60 for fixing and supporting the connector component 54 and the lens array component 55 while pinching the components 54 and 55 as shown in FIG. 8 or 9 may be formed in order to ensure the thermal insulation space by the predetermined distance C. The clip member 60 is a member formed by folding both ends of a rectangular metal piece, and is also a member for covering while making close contact with the back parts (the surface opposite to the surface opposed to the circuit substrate) of the connector component 54 and the lens array component 55. According to this configuration, a state of connection between the connector component 54 and the lens array component 55 can surely be held even when the connector component 54 is not fixed to the circuit substrate 24.

In the embodiment, the heat conducting sheet 56 has the lens array component corresponding portion (one example of a first heat conducting portion) defined by the length L1 and the connector component corresponding portion (one example of a second heat conducting portion) defined by the length L2, and the area of contact between the lens array component corresponding portion and the circuit substrate 24 is larger than the area of contact between the connector component corresponding portion and the circuit substrate 24. Also, the heat conducting sheet 56 is formed so as to extend in a direction (a separated direction) opposite to the connector component opposed region A2. Consequently, heat generated by the light receiving and emitting elements 52 in the lens array mounting region A1 is largely radiated in the lens array component corresponding portion of the heat conducting sheet 56 through the circuit substrate 24, and is not transferred to the connector component corresponding portion too much, and it becomes easy to thermally separate the lens array mounting region A1 from the connector component opposed region A2.

In addition, the heat conducting sheet 56 described in the embodiment is one example and, for example, may have a shape in which the heat conducting sheet is not formed on the back side of the connector component opposed region A2. Also, the heat conducting sheet 57 formed on only the back side of the lens array mounting region A1 in which the lens array component 55 is mounted may be used as shown in FIG. 7. The heat conducting sheet is constructed so as not to be formed on the back side of the connector component opposed region A2 and thereby, it becomes easy to thermally separate the lens array mounting region A1 from the connector component opposed region A2 in the circuit substrate 24.

Also, in the embodiment, the semiconductor 50 for control including the CDR device 50b is mounted on the circuit substrate 24 in a region opposite to the connector component opposed region A2 with respect to the lens array mounting region A1 as shown in FIG. 3. The CDR device 50b (one example of an electronic component) is a component with a heating value higher than that of the light receiving and emitting elements 52 and as described above, the CDR device 50b is mounted in the side opposite to the connector component opposed region A2 and a distance between the CDR device 50b and the connector component 54 is ensured and thereby, heat generated in the CDR device 50b is configured to be largely lost to the side of the electrical connector 22. Hence, it becomes easy to thermally separate the lens array mounting region A1 from the connector component opposed region A2 in the circuit substrate 24.

In addition, in the CDR device SOb, the back surface of the circuit substrate 24 may be provided with the CDR device SOb as shown in FIG. 8 or 9. By providing the back surface of the circuit substrate 24 with the CDR device SOb, a large amount of heat generated in the CDR device SOb is radiated to the side of the electrical connector 22 or the back surface side of the circuit substrate 24. Consequently, it becomes easy to thermally separate the lens array mounting region A1 from the connector component opposed region A2.

Second Embodiment

Figure 10:
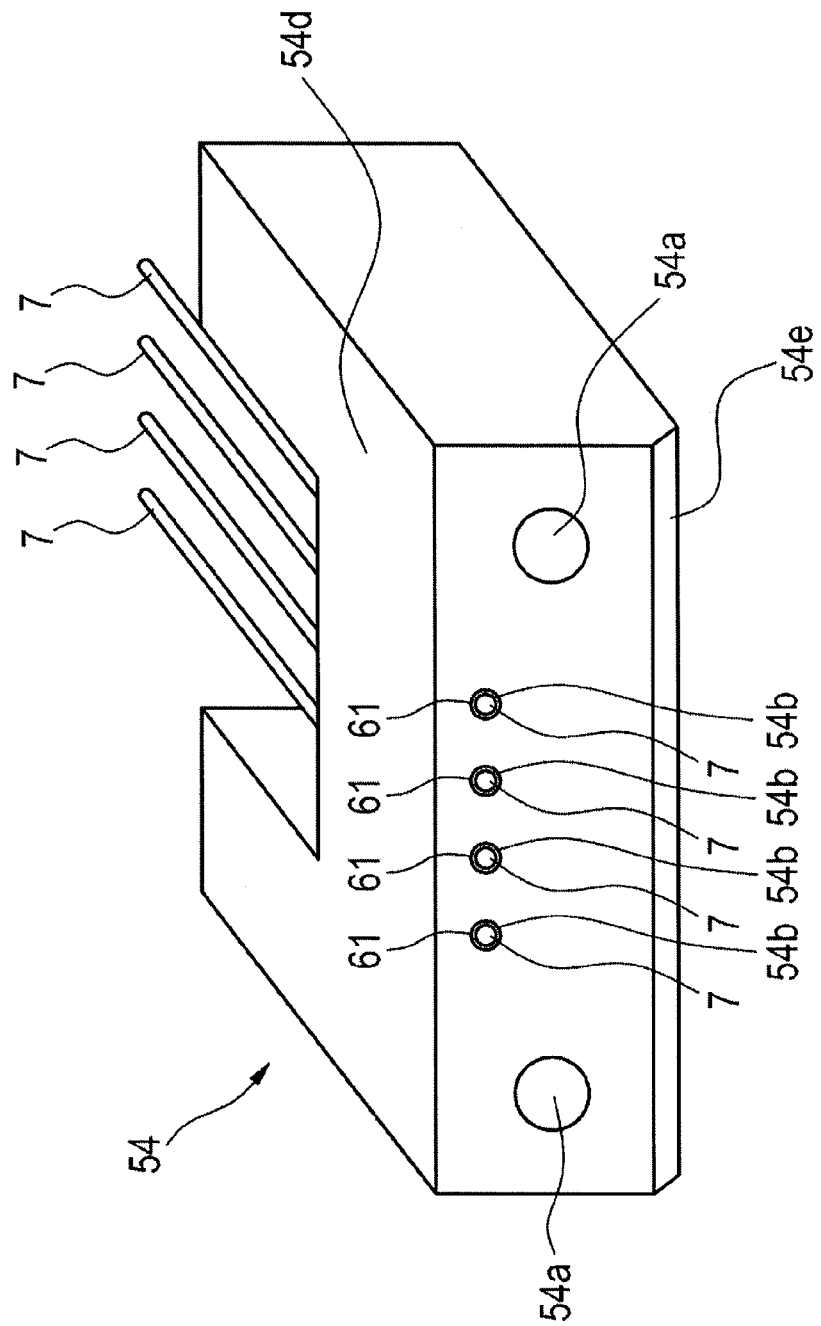
FIG. 10 is a perspective view showing a connector component used in an optical module according to a second embodiment.
Figure 11:
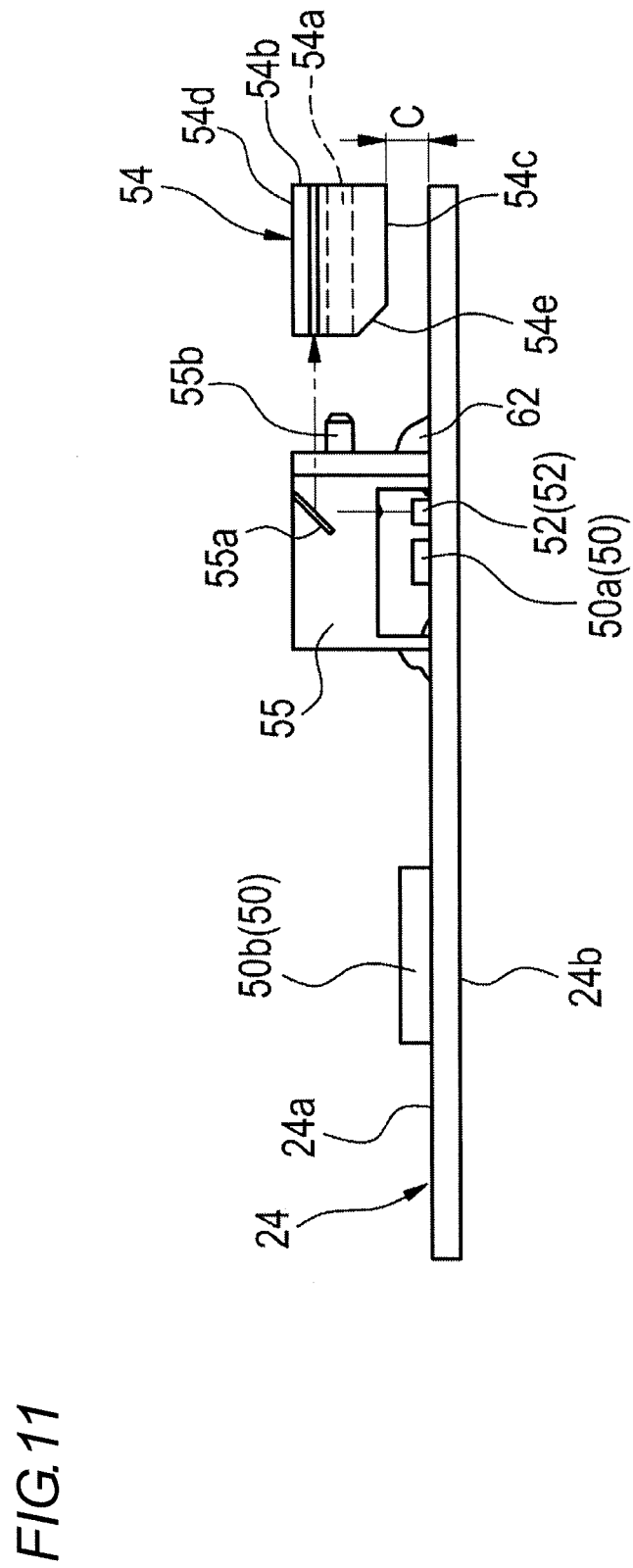
FIG. 11 is a view seeing a substrate of the optical module according to the second embodiment from the lateral side.
Figure 12:
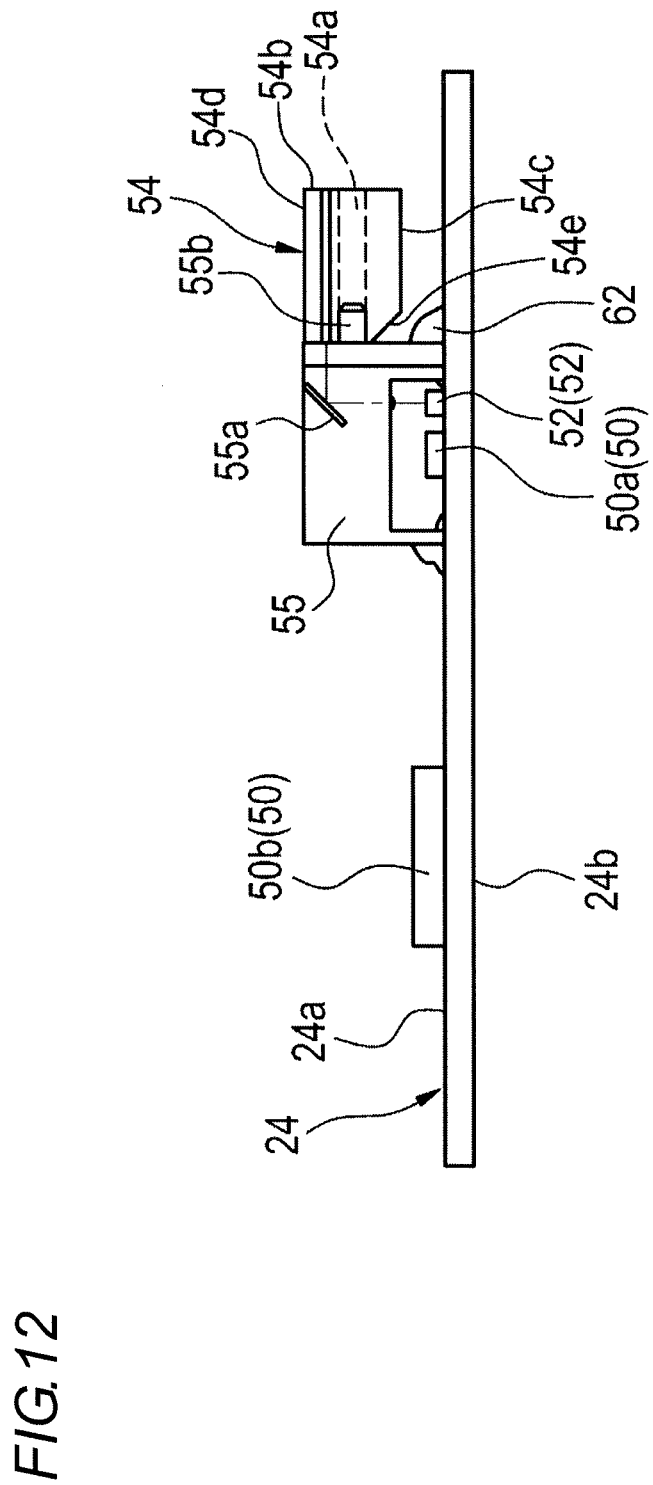
FIG. 12 is a view seeing the substrate of the optical module according to the second embodiment from the lateral side.

Next, an optical module according to a second embodiment will be described. As shown in FIGS. 10 to 12, optical fiber holding holes 54b into which optical fibers 7 are inserted is formed in a connector component 54. The optical fibers 7 (not shown in FIGS. 11 and 12) are inserted into these optical fiber holding holes 54b, and the optical fibers are glued and fixed to the optical fiber holding holes 54b by adhesives 61.

A lens array component 55 is fixed to a front surface 24a of a circuit substrate 24 by an adhesive. Positioning pins (one example of a first connecting part) 55b projecting to the side of the connector component 54 are formed in the vicinity of both lateral parts of this lens array component 55.

Also, positioning holes (one example of a second connecting part) 54a are formed along a longitudinal direction in the vicinity of both lateral parts of the connector component 54. The positioning holes 54a are formed in substantially the center in a thickness direction of the connector component 54, and the positioning pins 55b of the lens array component 55 are fitted into the positioning holes 54a to thereby make connection.

The connector component 54 has an upper surface (one example of a second surface) 54d and a lower surface (one example of a first surface) 54c. In each surface constructing the connector component 54, the upper surface 54d is formed opposite to the lower surface 54c, and the lower surface 54 is opposed to a thermal insulation space. In a state in which the lens array component 55 is connected to the connector component 54 by the positioning pins 55b and the positioning hole 54a. In the connector component 54, in a state in which the lens array component 55 is connected to the connector component 54 by the positioning pins 55b and the positioning holes 54a, the optical fiber holding hole 54b is formed at a position which is more distant from the circuit substrate 24 than a position at which the positioning holes 54a are formed in the second surface. Also, this connector component 54 has a chamfered part 54e in which the end of the side of the lens array component 55 in the lower surface 54c is chamfered along a width direction.

Here, in an optical module 11 having light receiving and emitting elements 52 which are optical elements, heat generated in a circuit etc. for driving the light receiving and emitting elements 52 is transferred from the circuit substrate 24 to the lens array component 55 fixed to the circuit substrate 24, and a part of the heat is further transferred to the connector component 54 through the portion of connection between the positioning pins 55b of the lens array component 55 and the positioning holes 54a of the connector component 54. This heat may soften or deteriorate the adhesive 61 for fixing the optical fibers 7 to the optical fiber holding hole 54b to deviate (change) a position in which the optical fiber holding hole 54b holds the optical fibers 7. When the position of the optical fibers 7 is deviated, a position in which an end face of the optical fibers 7 is connected to a lens portion formed on the lens array component 55 is deviated to cause a loss of optical connection.

Also, when an adhesive for connecting the lens array component 55 to the circuit substrate 24 leaks out as shown by numeral 62 in the lower surface 54c of the connector component 54, the lower surface 54c may make contact with this adhesive 62 leaking out. In this case, the adhesive 62 leaking out forms a thermal path for transferring heat from the circuit substrate 24 to the lower surface 54c of the circuit substrate 24, and the side of the lower surface 54c of the connector component 54 may change to a high temperature.

On the other hand, there is no fear that the adhesive 62 leaking out of a gap between the lens array component 55 and the circuit substrate 24 makes contact with the upper surface 54d of the connector component 54. Also, since the upper surface 54d is exposed to the side opposite to the circuit substrate 24, it is easy to maintain the upper surface 54d in a state of temperature lower than that of side of the lower surface 54c of the connector component 54.

In the optical module 11 according to the second embodiment, the optical fiber holding hole 54b is formed in a position nearer to the upper surface 54d tending to be maintained in the low temperature state than the positioning hole 54a, so that the optical fiber holding hole 54b can be inhibited from changing to a high temperature. Consequently, the adhesive 61 for fixing the optical fibers 7 to the optical fiber holding hole 54b can be prevented from softening or deteriorating, and a situation in which the end face of the optical fibers 7 is deviated to cause a loss of optical connection can be prevented.

Also, in the optical module 11 according to the second embodiment, the chamfered part 54e by chamfering is formed on the end of the side of the lens array component 55 in the lower surface 54c of the connector component 54. By chamfering the end of the side of the lens array component 55 in the lower surface 54c of the connector component 55 thus, the adhesive 62 leaking out can be prevented from making contact with the lower surface 54c even when the adhesive 62 for connecting the lens array component 55 to the circuit substrate 2 4 leaks out.

Also, the connector component 54 and the lens array component 55 may be pinched to be fixed and supported by a clip member 60 made of a material (for example, stainless steel, copper or aluminum) with high thermal conductivity (see FIGS. 8 and 9). Thus, the clip member 60 makes contact with at least a part of the upper surface 54d of the connector component 54. Consequently, by a heat conducting effect from the clip member 60, it becomes easy to maintain the upper surface 54d of the connector component 54 at low temperature, and the optical fiber holding hole 54b can more efficiently be maintained in a low temperature state.

The invention has been described above in detail with reference to the specific embodiments, but it is apparent to those skilled in the art that various changes or modifications can be made without departing from the spirit and scope of the invention.

For example, the example of providing the side of the optical coupling member with the positioning pin for positioning the optical coupling member and the optical fiber holding member is described, but the side of the optical fiber holding member may be provided with the positioning pin. That is, as long as a positioning structure is formed in both of the members, the concrete form is not limited. When a direction of attachment of the positioning structure is substantially parallel to a surface direction of the circuit substrate in this case, the optical fiber holding member can be connected along the circuit substrate, so that efficiency (workability) of assembly work improves as described above.

Also, the configuration in which the optical coupling member optically couples the optical fiber and the light receiving and emitting elements having different optical axes is not limited to the form of the lens array component 55. That is, it is not essential to form the reflector 55a, and a cave part having the same inclined surface as the reflector may be formed in a position corresponding to the reflector 55a of the lens array component 55 to form a reflective surface using a refractive index difference at the interface between air and material of the lens array component 55. Also, instead of the reflective surface, using an optical ferrule having an arcuate optical fiber holding hole capable of bending an optical fiber in an optical axis direction of light receiving and emitting elements, it may be configured to insert the optical fiber from the side of an optical fiber holding member and bend the optical fiber so as to match an optical axis of the optical fiber with an optical axis of the light receiving and emitting elements (in this case, the optical fiber can be prevented from being bent locally in a position of bonding between both of the members). That is, it is not essential to form the reflector 55a in the optical coupling member.

The invention has been described in detail with reference to the specific embodiments, but it is apparent to those skilled in the art that various changes or modifications can be made without departing from the spirit and scope of the invention.

The invention claimed is:

1. An optical module comprising:
a circuit substrate on which an optical element is mounted, the circuit substrate including a first region and a second region;
an optical fiber holding member including an optical fiber holding hole into which an optical fiber is inserted and fixed by a first adhesive;
a lower surface facing the second region of the circuit substrate;
an upper surface opposite to the lower surface;
a second connecting part; and
an optical coupling member which includes a first connecting part connected to the second connecting part and is fixed on the first region of the circuit substrate by a second adhesive and optically connects the optical fiber to the optical element on the circuit substrate and is constructed of a material with a linear expansion coefficient different from that of the optical fiber holding member,
wherein a thermal insulation space is formed between the lower surface of the optical fiber holding member and the second region,
wherein the first connecting part is a positioning pin and the second connecting part is a positioning hole or the first connecting part is the positioning hole and the second connecting part is the positioning pin, and
wherein a center axis of the fiber holding hole is nearer to the upper surface than a center axis of the positioning pin.

2. The optical module according to claim 1, wherein an end portion of the first surface of the optical fiber holding member nearer to the optical coupling member is chamfered.

3. The optical module according to claim 1, wherein the circuit substrate has a first mounting surface on which the optical element is mounted and a second mounting surface opposite to the first mounting surface, and a heat conducting member is mounted on the second mounting surface of the circuit substrate, and the heat conducting member has a first heat conducting portion in the first region of the second mounting surface and a second heat conducting portion in the second region of the second mounting surface, and an area of the first heat conducting portion is larger than an area of the second heat conducting portion.

4. The optical module according to claim 3, wherein the heat conducting member is formed in the first region of the second mounting surface and is only partially formed in the second region of the second mounting surface.

5. The optical module according to claim 3, wherein the heat conducting member is formed in the first region of the second mounting surface and is provided so as to extend to a side opposite to the second region of the second mounting surface.

6. The optical module according to claim 1, wherein an electronic component with a heating value higher than that of the optical element is mounted on the circuit substrate in a region opposite to the second region with respect to the first region.

7. The optical module according to claim 6, wherein the electronic component is mounted on the second mounting surface of the circuit substrate.

8. The optical module according to claim 1, comprising a clip member for mechanically joining the optical coupling member to the optical fiber holding member.

9. The optical module according to claim 8,
   wherein the clip member is a member with thermal conductivity higher than that of the optical fiber holding member, and
   wherein the clip member makes contact with at least a part of the second surface of the optical fiber holding member.

* * * * *